United States Patent Office 2,940,105
Patented June 14, 1960

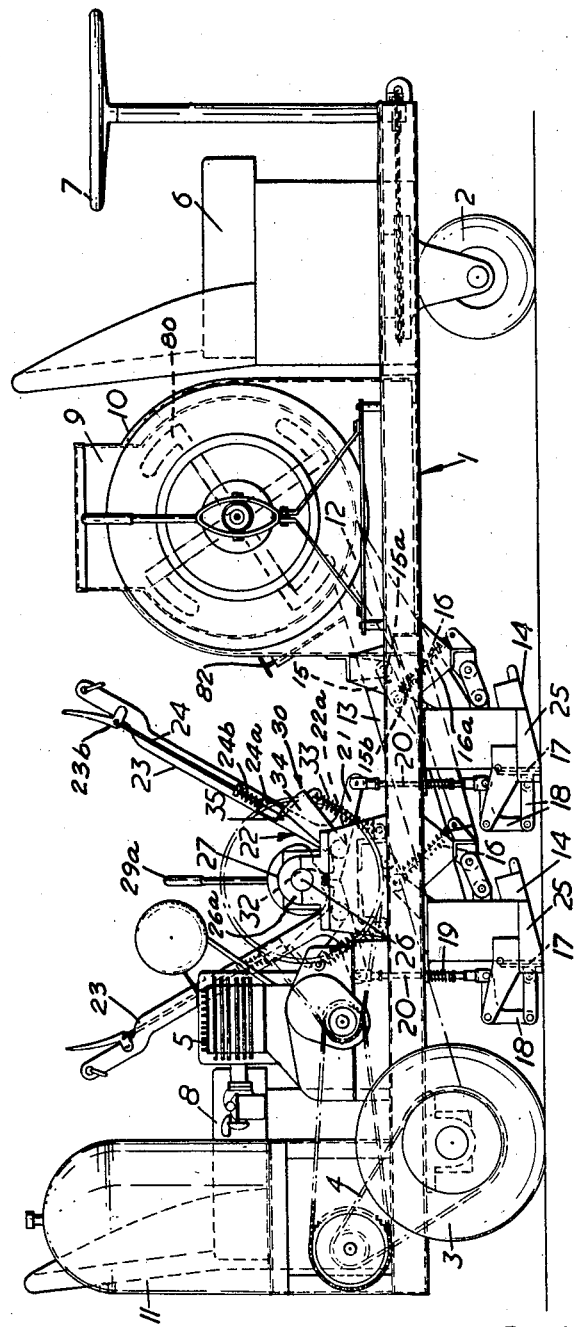

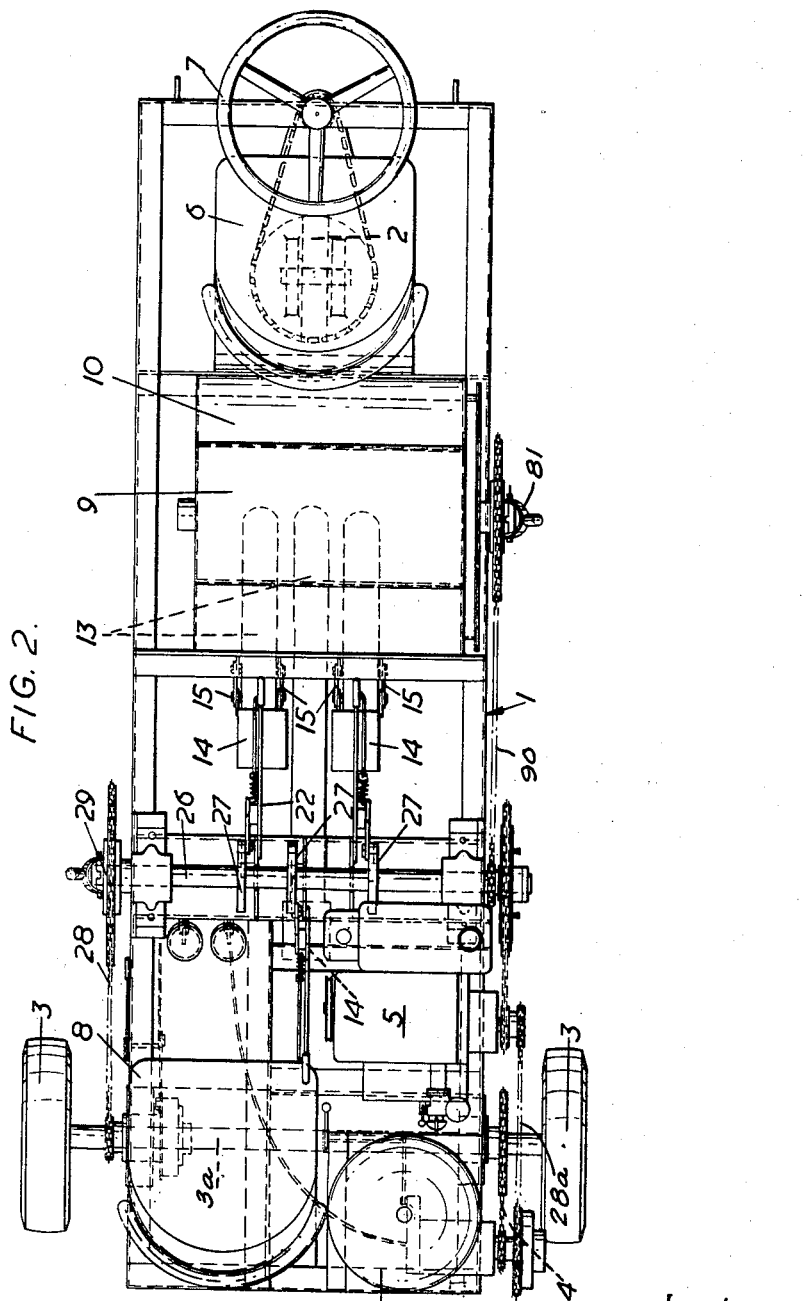

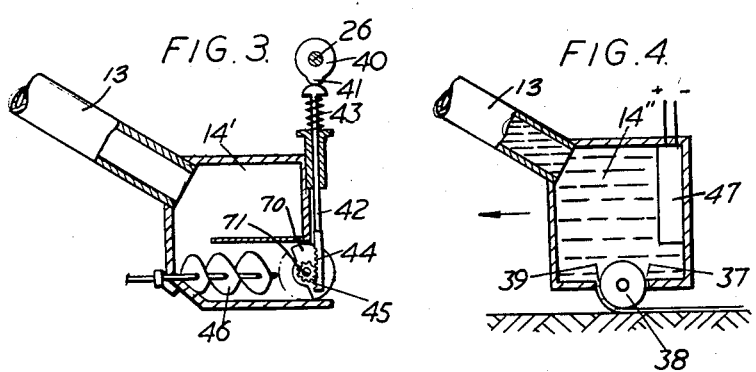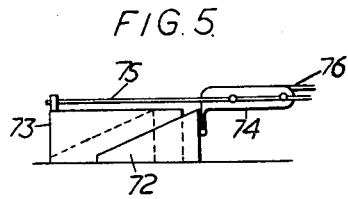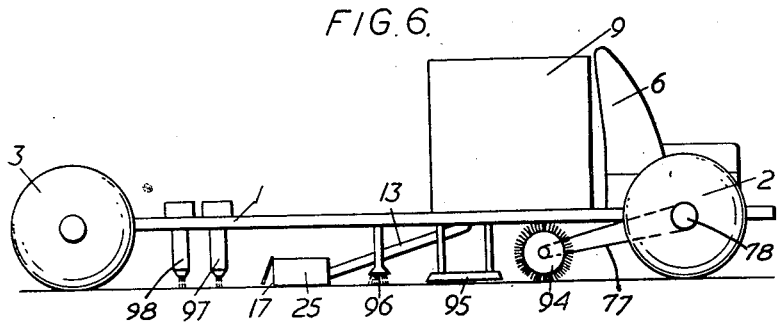

2,940,105
DEVICES FOR MARKING INDICATOR LINES ON ROAD SURFACES

William Duchatel Woellwarth, The Cedars, Crockford Park Road, Addlestone, England Filed Nov. 1, 1955, Ser. No. 544,237

Claims priority, application Great Britain Nov. 1, 1954

21 Claims. (Cl. 15—131.05)

This invention relates to machines for applying indicator lines, more particularly of plastic material, to road surfaces. Such indicator lines are continuous, or intermittent dashes, or a number of parallel lines sometimes of different colours. Such lines are frequently employed in conjunction with reflector pads or "cat's eyes" embedded in the road surface in the longitudinal axis of the lines, and in such cases the lines have to be interrupted at such pads.

It is essential that such lines have clear cut longitudinal edges and square cut ends at points of interruption, and must be of a material which will adhere firmly to the road surface if they are to last for a satisfactory period of continuous wear from road wheels passing over them. Further when such lines are laid it is undesirable to leave any drips of the marking material on the road surface.

The main object of this invention is to provide a dirigible automatic machine for marking single or multiple continuous or interrupted indicator lines on road and like surfaces, such as airport runways for example, which can be accurately operated by the minimum number of unskilled maintenance personnel, and will enable plastic marking compositions particularly, but not exclusively, to be accurately and quickly laid in the desired pattern.

A further object of the invention is to provide a machine for marking a surface such as a road with indicator lines comprising a dirigible chassis, a marking material container mounted on the chassis, at least one material distributing box mounted on the chassis, a conduit connecting said container to each distributing box, a variable outlet gate to each box through which liquid flows as a strip from the box onto the road surface, and an actuating device for opening and closing each outlet a predetermined distance, with each outlet being disposed in the marking position in close proximity to the surface to be marked.

A further object of the invention is to provide a machine constructed for laying lines of quick-setting plastic composition marking material which has to be maintained at a minimum temperature to ensure its satisfactory flow from the container to the distributor outlet. For this purpose the container is provided with heating means such as gas or liquid fuel burners, which may be thermostatically controlled, and the distributors and/or conduits connecting the container to the moulds may be similarly heated during line laying operations. In the latter construction the distributor and/or conduit heating means may be provided with control devices whereby the heat is only supplied when the distributor is in the line laying position. The container may be provided with agitators, actuated from the chassis prime mover or a source of power on the chassis to agitate the marking material in the container.

Yet a further object is to provide a machine having devices on the chassis and actuated by the chassis prime mover or road wheels to sweep the surface on which the line is to be laid, to heat the surface before the line is laid to assist in the adherence of the marking material thereto and rapid drying thereon, to deposit as by spraying a "tack" coat on the surface to assist in the adherence of the line material to the surface, and to deposit ballotini on the newly laid line material before it has set on the road or like surface.

In order that the invention may be more clearly understood, one construction and a number of details and modifications of construction will now be described, by way of example, with reference to the accompanying drawings, in which:

Fig. 1 is a side view of a road or like indicator marking machine;

Fig. 2 is a plan view of the machine shown in Figure 1;

Fig. 3 is a detail in cross-section of a gate for marking material distributor for use in such machines;

Figs. 4 and 5 are side views of alternative distributors; and

Fig. 6 is a diagrammatic side elevation showing a modified construction of marking machine.

In the drawings the same numerals are used in all the figures to indicate the same or similar parts.

Referring to Figures 1 and 2, the road marking machine comprises a wheeled chassis 1 having a front dirigible wheel 2 (or a pair of front dirigible wheels) and a pair of rear wheels 3 which are driven, conveniently by a chain drive 4, from an internal combustion engine 5 or other power unit mounted at the rear and on the right hand side of the chassis 1.

A seat 6 and a steering wheel 7 for a steersman are provided at the front of the chassis or in any other suitable position and a further seat 8 for the driver and operator of the vehicle is provided at the rear end thereof or in any other suitable position, the normal controls for the power unit and hand and foot brakes, together with controls for the mechanism for applying the plastic road marking composition, being grouped for convenient operation by the driver/operator when in the seat 8.

Mounted behind the steersman's seat is a container 9 of a size to carry a convenient quantity of plastic road marking composition, the container being provided with a heating apparatus such as an oil fired burner and having a suitable flue casing 10. Preferably, to minimise the attention to the container heating apparatus required by the driver, the burner (not shown) is supplied with fuel gas stored under pressure in a cylinder 11 which is conveniently mounted on the right hand side at the rear of the frame 1. A control device is provided for adjusting the fuel supply to the burner, and the flue casing is provided with a door (not shown) to give access to the burner for lighting the latter and cleaning the flue and burner.

The container 9 is formed with a bottom which slopes downwardly towards discharge outlets 12 which are connected by flexible pipes 13 to distributors 14 from which the plastic composition heated in the container is laid on the road or like surface.

The distributors comprise one or more feed boxes, for example three, which are pivotally connected at 15a to the chassis by means of links 15, the feed boxes being movable in a vertical direction and resiliently urged downwardly into contact with the road surface by springs 16 connected to the links 15 at 15b and to the member 16a forming part of the chassis. Each feed box 14 is provided with an outlet closable by a flap 17 hinged thereto and operable by links 18 pivoted on the box, the flaps being normally urged by springs 19 to the closed position. Links which raise each box and operate the flap thereon are pivotally connected by a rod 20 to one arm 21 of a bell crank lever 22 pivotally mounted on the frame by a pivot 22a, the other arm 23 of the bell crank lever being arranged for manual actuation.

The arrangement of the links 15 on the feed box 14 is such that by movement of the bell crank lever 22 in one direction the feed box 14 is lowered into contact with the road surface and, at the conclusion of such movement, the flap 17 on the feed box 14 is opened to a predetermined extent by further movement of the lever 22 to permit the discharge of plastic composition therefrom at a desired rate. Opposite movement of the lever 22 closes the flaps 17 and raises the feed box 14 clear of the road. The length of the rod 20 may be adjusted to regulate the size of the outlet from the feed box 14 when the flap 17 is opened and the feed box 14 has secured thereto readily exchangeable skid plates 25 of hardened steel which take up the wear created by contact with the road surface.

Mounted on the chassis 1 is a transverse cam shaft 26 having three cams 27 thereon for automatic actuation of the feed boxes 14 and the flaps 17 thereon. The cam shaft 26 is conveniently driven by a chain drive 28 from the axle 3a, in turn driven through the chains 4 and 28a from engine 5 and can be engaged or disengaged by the operation of a dog clutch 29 through a shift lever 29a. The cam shaft 26 is preferably arranged so that it may be readily removed from the machine and replaced by another shaft carrying a different set of cams, as required by the intended manner of operation of the machine. This removal of the cam shaft is effected by removing the upper half 26a of each cam shaft bearing.

The cams 27 are each arranged for co-operation with a cam lever 30 which is pivotally mounted intermediate its ends on the chassis, preferably on the pivot 22a coaxially with the bell crank levers 22. The lower end of each cam lever 30 carries a cam roller 32 and is urged by a spring 33 into engagement with its cam 27 and the other end 34 of the cam lever 30 is adapted to be engaged by the manually operable arm 23 of the corresponding bell crank lever 22. For this purpose the arm 23 of the bell crank lever 22 is conveniently formed with a rod 24 having a finger 35 on its lever end, slidably mounted in fixed guides 24a on the bell crank lever 22 and urged by a spring 24b downwards, for engagement with the end 34 of the cam lever 30, the upper end of the rod 24 being pivoted to a hand grip 23b pivoted on the upper end of the arm 23 of the bell crank lever 22 so that movement of the hand grip 23b towards the arm 23 moves the rod upwards against the action of the spring 24b to disengage the finger 35 from the end 34 of the cam lever 30. A catch 23a may be provided on the arm 23 to lock the hand grip 23b to maintain the finger 35 in the disengaged position. When the hand grip 23b is forced against the arm 23, the lever 22 may be moved about its pivot and the finger 35 engaged in the end 34 of the cam lever by releasing the grip 23b, the springs 16 acting on the links 15 to maintain such contact, so that movement of the cam lever 30 on rotation of its cam 27 will cause the feed box 14 to be raised and lowered, and the plastic composition discharged therefrom, as determined by the contour of the cam 27. Thus the cams 27 may be shaped so as to effect raising and lowering of the feed boxes 14 automatically to apply interrupted lines of marking composition on the road with a predetermined length and spacing of the lines. Any or all of the feed boxes 14 may be operated automatically, or by hand operation of the arm 23, or one or more automatically and the other or others manually as necessary, and each cam 27 or set of cams will be designed to effect the laying of lines of the plastic composition having the desired characteristics as regards the width of line and spacing between successive interrupted portions of line.

The finger 35 can also be engaged with a fixed stop member (not shown) on the chassis, to lock the arm 23 in a position in which the corresponding feed box 14 is raised and the flap 17 thereof closed.

To ensure that the lines are laid in the correct positions, it is important that the distributor or mould from which the plastic composition flows is moved accurately over the site of the line or above the existing line to be relaid.

Figure 3 illustrates diagrammatically a box 14' having a volume displacement distributor gate. While a flap type outlet closure 17 as shown in Figures 1 and 2 is satisfactory with some marking materials, such as paint, it has the disadvantage that on closing the flap the marking material is forced back into the distributor box against the pressure head therein and in the container 9 which demands a considerable force to close the flap. The closure shown in Figure 3 consists of a semi-cylindrical member 70 rotatably mounted on a shaft 71 journalled in borings in the walls of the distributor and so shaped that when rotated (counterclockwise in Figure 3) to open the outlet a portion of its solid cylindrical half enters the distributor; on rotating the member 70 to close the outlet the solid portion is withdrawn from the distributor interior and its size is such that the volume of this portion equals substantially that of the material forced back into the distributor so that no great force is necessary to overcome the head of material therein and in the container.

Referring to Figure 4 the box 14" has a lower opening 37 closed by a roller 38 leaving on the forward side a clearance space 39 between the roller and the edge of the opening 37, so that as the machine moves in the direction of the arrow B in Figure 4 the marking material will be carried downwardly by the rotating roller 38, which runs along the surface being marked and lay a line of such material thereon, while this construction can be employed with any flowable marking materials, it is most suitable for freely flowing materials such as paint.

In Figure 5 the box has a wedge shaped member 72 sliding in it which is withdrawn to open the left hand bottom part of the box to allow the marking material therein to engage and adhere to the road, the lower end of the rear wall 73 of the box being spaced above the road surface by the thickness of the line to be laid. The wedge is connected to a slide 74 on a rod 75 by which the box is drawn along by the machine. A second rod 76 is connected to the slide 74 and to open the box this is pulled to the right in Figure 5 and to close the box the rod 76 is released and the box slides over the wedge which closes the outlet. Operative movement of the rod 76 may be effected by a time lag motion as described above if desired.

It will be understood that the rotary gate in Figure 3 and the sliding gate of Figure 5 are operated from the main cam shaft 26 in the same way as the flap gates shown in Figures 1 and 2. In Figure 3 the cams 40, in the cam shaft 26, each have a nose 41 which depresses a rod 42, slidably arranged on the box 14, against the action of a spring 43; the lower end of the rod 42 has a rack 44 thereon in mesh with a pinion 45 fast on the shaft 71 of the rotary gate 70.

In the box 14' in Figure 3, and also in those shown in Figures 1 and 2 if desired, the marking material is forced towards the gate through a series of ducts by a feeding screw 46 rotated therein from the cam shaft 26 or other shaft on the mechanism operatively connected in timed relation to the vehicle road wheels. Any other extruding device may however be employed.

All the boxes or any of them may be provided with heating means, such as electric resistance elements 47 shown in Figure 4 energised for example from the dynamo of the vehicle engine; alternatively a duct may be led from the heated marking material container 9 into the boxes 14 or into hollow walls surrounding the boxes 14 through which some of the heating medium from the container 9 is circulated to reheat the marking material in the boxes so that it is of sufficiently low viscosity to be easily delivered through the gate.

Further the boxes may be pressure operated so that marking material is delivered therefrom under hydraulic or pneumatic pressure, the pressure being controlled in relation to the speed of laying the line, i.e. of the vehicle road wheels, the degree of pressure applied at any given time being such that the amount of material ejected from the distributor is such that the predetermined thickness of line is laid on the road surface.

Referring to Figure 6, this shows a combined machine, having a rotary brush 94 driven by a chain 77 from the front axle 78 for example, to clean the road surface, a heating device 95 through which heating medium from the container 9 is circulated to provide the necessary heat to soften the surface to receive the marking material and to assist the material to adhere to the surface, a dispenser 96 for spraying a "tack coat" on the line site which further assists in the adherence of the marking material, a box 25 similar to those described with reference to Figures 1–5 and finally a ballotini dispenser 97 mounted on or close to the box for dispensing ballotini material on the marked line on the road, the dispenser outlet being raised above the box outlet 17 so that the time taken for the ballotini to fall ensures that it misses the gate 17. The ballotini dispenser outlet may be operated separately by the steersman. Also a jet 98 may be provided to send a jet of cold air onto the material as soon as the line is laid to cool it quickly and enable the road to be reopened to traffic as quickly as possible.

Means are preferably provided to effect automatic stirring or agitation of the plastic composition in the container 9, this conveniently being effected by a rotary paddle 80 mounted in the boiler on shaft 42 and driven by a belt, chain or other drive 90 through a clutch 81 from the engine 5 of the machine.

If desired one or more of the boxes may be fed with plastic composition of a different colour from separate containers 9 each having its own agitator and heating means. The containers are each self contained units having connections through dog clutch devices from the motor 5.

Means may also be provided to heat the flexible pipes 13 between container 9 and feed boxes 14 to prevent clogging of the pipes or boxes.

The outlets 12 from the container 9 are preferably closable by manually operable valves 82, to permit plastic composition to be drained from the flexible pipes 13 after use of the machine and to enable delivery of the composition to the distributors 14 to be effected only when the composition has reached the required temperature and consistency for application to the road surface. The valve mechanism is preferably quick acting to avoid the material flowing once the gate 17 is closed.

The boxes 25 and their operating cams may be mounted in the chassis for quick removal and replacement as described with reference to the cam 26 Figure 1 and may be movable laterally in the chassis to vary the position of the line or lines laid. Means may be provided to vary the width of the opening 17 so that lines of varying widths may be laid.

I claim:

1. A steerable wheeled vehicle for use in marking road and like surfaces with indicator lines including a heated container for the marking material characterised by at least one vertically movable distributing box, a flexible conduit connecting each box to said container, an outlet on the rear face of each box adjacent the bottom thereof, means for lowering each box into close proximity to the road surface and for raising said box, a closing device for each outlet, and means for actuating each said closing device to an open position when the respective box is fully lowered and to the closing position as said box is raised such that the marking material can flow from the outlet of a lowered box onto the road surface as the vehicle is advanced and flow of marking material from said outlet is obturated by said closing device when the box is raised from the road surface.

2. A steerable wheeled vehicle for use in marking road and like surfaces with indicator lines comprising a vehicle frame having steerable wheels, a heated container for the marking material mounted on said frame, a number of generally vertically movable distributing boxes on said frame, means for vertically moving said boxes, flexible conduits each connecting one of said boxes to said container, an outlet for the marking material on the rear face of each said box and adjacent the bottom thereof; a closing device for each said outlet, means for actuating each said closing device to a fully open position when the respective box is fully lowered and to a fully closed position as said box is raised, such that the marking material can flow from the said outlet of a lowered box onto the road surface, as the vehicle is advanced and flow from said outlet is obturated by said closing device when the box is raised from the road surface.

3. A steerable wheeled vehicle for use in marking road and like surfaces with indicator lines comprising a steerable wheeled chassis, a heated container for the marking material mounted on the chassis, a number of vertically movable distributing boxes on said frame, means for moving said boxes vertically independently, a number of flexible conduits each connecting one of said boxes to said container, an outlet for the material on the rear face of and adjacent to bottom of each said box, a closing device for each box outlet comprising a flap hinged to each said box wall so as to swing outwardly, a linkage connected to said flap and to the means for raising and lowering said boxes, so that the marking material is permitted to flow from the open outlet of a lowered box onto the road surface as the vehicle is advanced and flow of marking material from said box is obturated when said box is raised from the road surface.

4. A steerable wheeled vehicle according to claim 2 characterised in that a cam means is provided and operatively connected to the vehicle road wheels and to said means for vertically moving said boxes, said cam means being such that said means for vertically moving said boxes and said box closing means actuate synchronously with said road wheels thereby regulating the flow of material from said box outlets to lay an intermittent line on the road.

5. A steerable wheeled vehicle according to claim 4 characterised in that the means for raising said boxes comprises a rotary cam shaft journalled in the vehicle frame, and levers operatively connected one to each box and the closing means thereof, and springs disposed positively to hold said levers in engagement with said cams, said cams being shaped so that on rotation of said shaft each cam will actuate a box and the closing means thereof.

6. A steerable wheeled vehicle according to claim 4 characterised in that said means for vertically moving said boxes include hand operated members, each said member being positively connected to one of said boxes and also includes means driven synchronously with the road wheels of the vehicle, said synchronously driven means and said hand operated members being disposed so that said hand operated members can over-rule the actuation of said boxes and closing means by the synchronously driven means.

7. A steerable wheeled vehicle according to claim 4 characterised in that the closing device for each box comprises a semi-cylindrical valve rotatable on said box outlet, the plain face of said valve forming in the closed position substantially a continuation of said box wall and in its open position one half of said valve being disposed within said box and obturating one half of said box outlet.

8. A steerable wheeled vehicle for marking surfaces such as roads with indicator lines comprising a dirigible chassis having vehicle road wheels, a marking material container mounted on the chassis, at least one vertical movable material distributing box mounted on the chassis having an operating position in close proximity to the surface to be marked, actuating means on said vehicle for automatically raising and lowering each box, a flexible conduit connecting said container to each distributing box, an outlet on the lower rear portion of each box, and a variable closing device to each box to open said box outlet when said box is moved to a lower position so as to permit liquid to flow as a strip from the box onto the road surface, said actuating means being operatively associated with the vehicle road wheels when said box is lowered so that said actuating means is synchronized with said wheels.

9. A steered marking vehicle for marking surfaces according to claim 8 comprising a plurality of boxes, said actuating means being operatively connected independently to each box so that any box may be moved into and out of the lowered position and their closing devices actuated independently of each other.

10. A steered marking vehicle for marking surfaces such as roads with indicator lines comprising a dirigible chassis, a marking material container mounted on the chassis, at least one material distributing box mounted on the chassis, a conduit connecting said container to each said distributing box, actuating means for vertically moving each box, a variable outlet gate to each said box shaped so that liquid as a strip flows therethrough onto the road surface, and an actuating device for opening and closing each said outlet a predetermined distance as said box is lowered and raised respectively, each said outlet being disposed in the marking position in close proximity to the surface to be marked, and said container having a downwardly sloping bottom leading at its lower end into at least one conduit.

11. The vehicle of claim 10 comprising an agitator in said container.

12. A steered marking vehicle for marking surfaces such as roads with indicator lines comprising a dirigible chassis having wheels, a marking material container mounted on the chassis, at least one vertically movable material distributing box mounted on the chassis, a device for heating the material in said container, a conduit connecting said container to each said distributing box, an outlet to each said distributing box from which liquid flows as a strip onto said surface, raising and lowering means operatively connected to each said distributor for raising and lowering each said distributor into and out of its operating position in close proximity to said surface, an outlet closing device connected to each said box and operative upon raising said box, and at least one variable control device on said chassis operatively connected to each said box through the raising and lowering means and to the wheels so that the dimensions and pattern of lines laid and the number of lines may be varied in timed relation with the wheels, each said outlet being disposed in the lower rear portion of its box to be in close proximity to the surface to be marked.

13. A steered marking vehicle for marking surfaces according to claim 12 comprising hand actuation devices each operatively connected to at least one of said boxes and raising and lowering means and operable independently of said variable control device, a control device operatively connected to all said variable control devices to selectively overrule the variable control devices in favor of the hand operation without interrupting operation of the vehicle.

14. A steered marking vehicle for marking surfaces according to claim 12 wherein each variable control device includes a cam shaft disposed in the chassis, and cams on said shaft, a drive transmission operatively connecting said cam shaft in timed relation to said wheels, said cams being operatively associated with the boxes and said closing devices.

15. A steered marking vehicle for marking surfaces according to claim 12 wherein each outlet closing device comprises a hinged flap operated by said variable control devices in timed relation to said wheels.

16. A steered marking vehicle for marking surfaces according to claim 12 wherein each said outlet closing device comprises a semicylindrical member rotatably mounted about substantially the center line of its flat side in the box outlet, the dimensions of the semicylindrical member being such that in its open position half the outlet is uncovered with half the member in the box and in its closed position the outlet is sealed with the semicylindrical member disposed outside the box.

17. A steered marking machine for marking road and like surfaces comprising a dirigible chassis, a marking material container mounted on the chassis, at least one generally vertically movable material distributing box, a conduit connecting said container to each said box, an outlet to each said box, a raising and lowering device operatively connected to each said box and actuatable to move said box respectively into an inoperative position and an operative position in close proximity to said surface, an outlet closing device operatively connected to each said outlet, a cam shaft journaled in said chassis, at least one cam on said cam shaft and shaped and positioned to actuate said raising and lowering device and said outlet closing device to open said outlet when said box is lowered by rotation of said shaft, and a drive mechanism between said chassis road wheels and said cam shaft being operatively connected in timed relation to said road wheels.

18. A steered marking vehicle for marking surfaces according to claim 17 wherein said cam shaft is removable so it may be replaced by a different cam shaft to change the pattern of at least one of said lines to be laid.

19. A steered marking vehicle for marking surfaces according to claim 17 comprising a number of links each pivotally connected to each box and to said chassis, said links being vertically movable with respect to the chassis, and springs disposed to urge the boxes into the operative position and to control movement of said links.

20. A steered marking vehicle for marking surfaces according to claim 17 wherein said raising and lowering device includes a rod connected to each box, and a bell crank lever having one arm pivoted to said rod and the other arm disposed to be engaged and actuated by the cam mechanism to actuate said rod to lower the box into the operating position and subsequently to open the box outlet, and vice versa.

21. A steered marking vehicle for marking surfaces according to claim 17 wherein said raising and lowering device includes at least one cam lever pivoted intermediate its ends to said chasses, and a manually operable bell crank lever pivoted to said chassis coaxially with and cooperable with said said cam lever, each said cam lever having a roller on one end disposed to engage one cam and at its other end being selectively connected to one arm of the bell crank lever for selectively overriding the cam device.

References Cited in the file of this patent

UNITED STATES PATENTS

| | | |
|---|---|---|
| 1,610,773 | Hansen | Dec. 14, 1926 |
| 1,684,574 | Carlsson | Sept. 18, 1928 |
| 1,726,832 | Hollingshead | Sept. 3, 1929 |
| 1,912,897 | Huet | June 6, 1933 |
| 2,044,558 | Ball | June 16, 1936 |
| 2,056,258 | Cummings | Oct. 6, 1936 |
| 2,065,998 | Emmons | Dec. 29, 1936 |
| 2,262,497 | Holesworth | Nov. 11, 1941 |
| 2,290,302 | Terry | July 21, 1942 |
| 2,301,848 | Beaman | Nov. 10, 1942 |
| 2,357,930 | Clark | Sept. 12, 1944 |
| 2,578,080 | Middlestadt | Dec. 11, 1951 |

FOREIGN PATENTS

| | | |
|---|---|---|
| 705,457 | Great Britain | Mar. 10, 1954 |